US005342153A

United States Patent [19]

Dobkins

[11] Patent Number: 5,342,153

[45] Date of Patent: Aug. 30, 1994

[54] PORTABLE DRILL SUPPORT WITH A WORK SURFACE ENGAGING BASE

[76] Inventor: Edward L. Dobkins, 2500 E. 40th, Hutchinson, Kans. 67502

[21] Appl. No.: 61,085

[22] Filed: May 14, 1993

[51] Int. Cl.[5] .............................................. B23B 45/14

[52] U.S. Cl. ...................................... 408/1 R; 408/76; 408/712

[58] Field of Search ................. 408/1 R, 76, 110, 111, 408/712, 135

[56] References Cited

U.S. PATENT DOCUMENTS

| | | | |
|---|---|---|---|
| 2,821,875 | 2/1958 | Buck | 408/76 |
| 3,261,235 | 7/1966 | Henkel | 408/76 |
| 3,371,257 | 2/1968 | Warren et al. | 408/76 |
| 3,387,509 | 6/1968 | Lupear | 408/234 |
| 3,456,738 | 7/1969 | Harry | 408/76 |
| 3,500,707 | 3/1970 | Warren | 408/76 |
| 3,596,558 | 8/1971 | Rydell | 408/76 |
| 4,541,759 | 9/1985 | Miyoshi | 408/76 |

*Primary Examiner*—Daniel W. Howell
*Attorney, Agent, or Firm*—John Wade Carpenter

[57] ABSTRACT

A drill support having a base, and a body secured to and supported by the base. A saddle member is movably disposed on the body and a drill is removably disposed or secured to the saddle member in order to move up and down therewith.

19 Claims, 14 Drawing Sheets

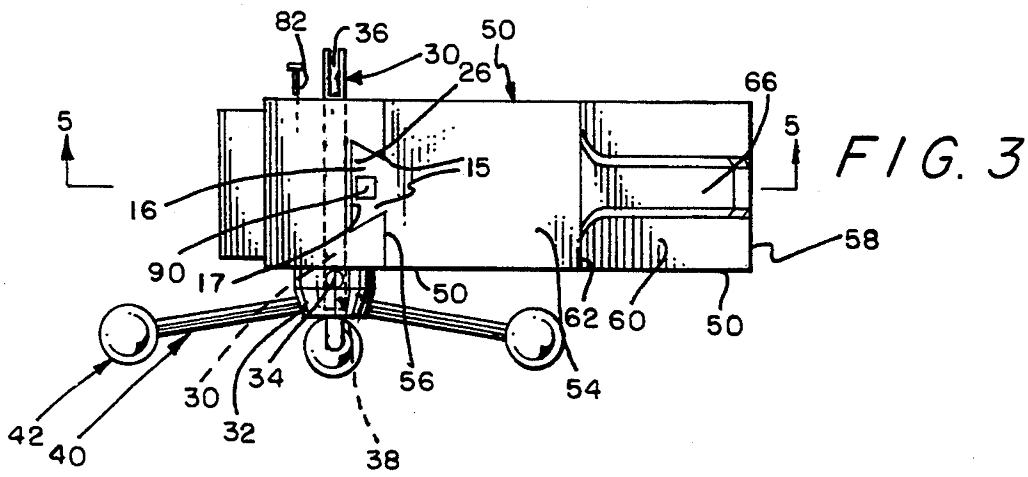
FIG. 3
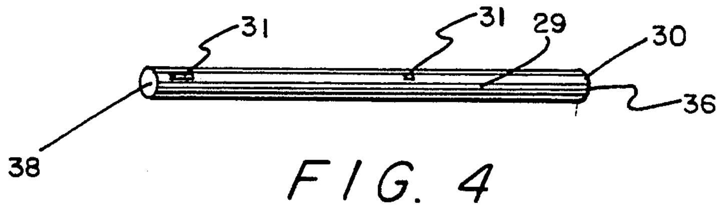
FIG. 4
FIG. 5
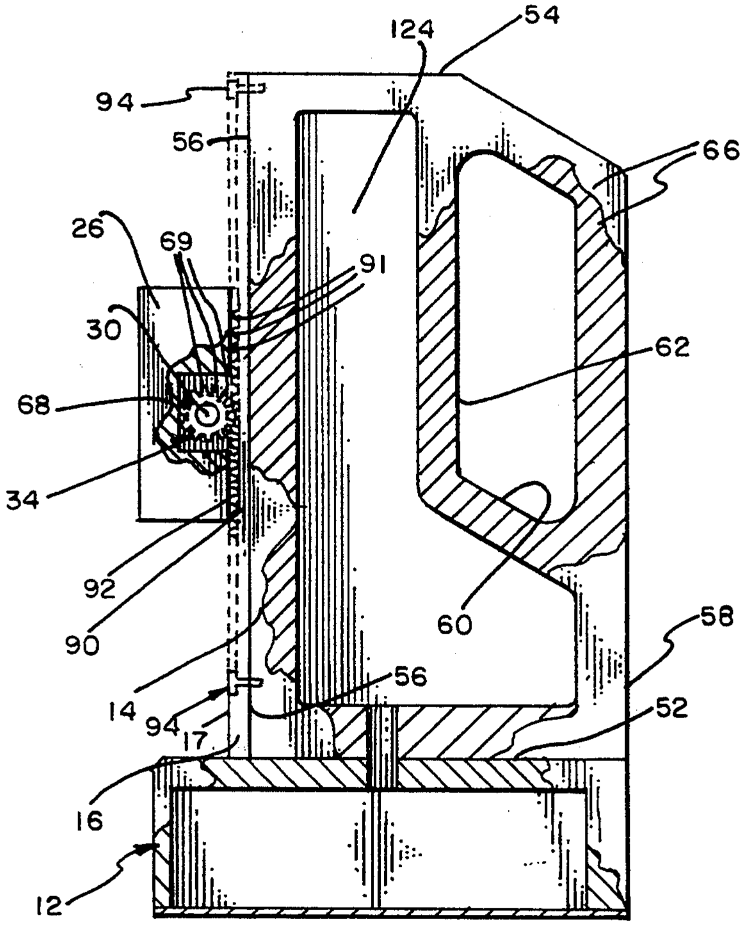

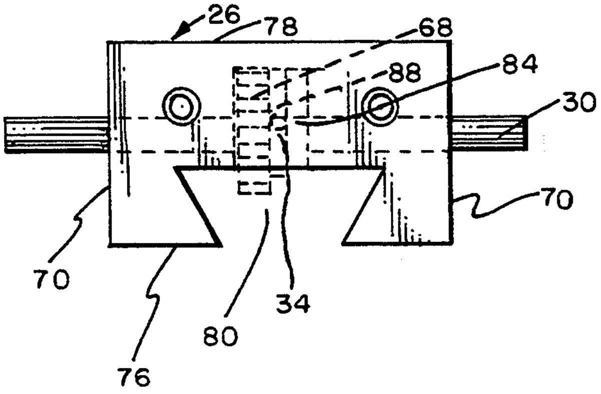
FIG. 6
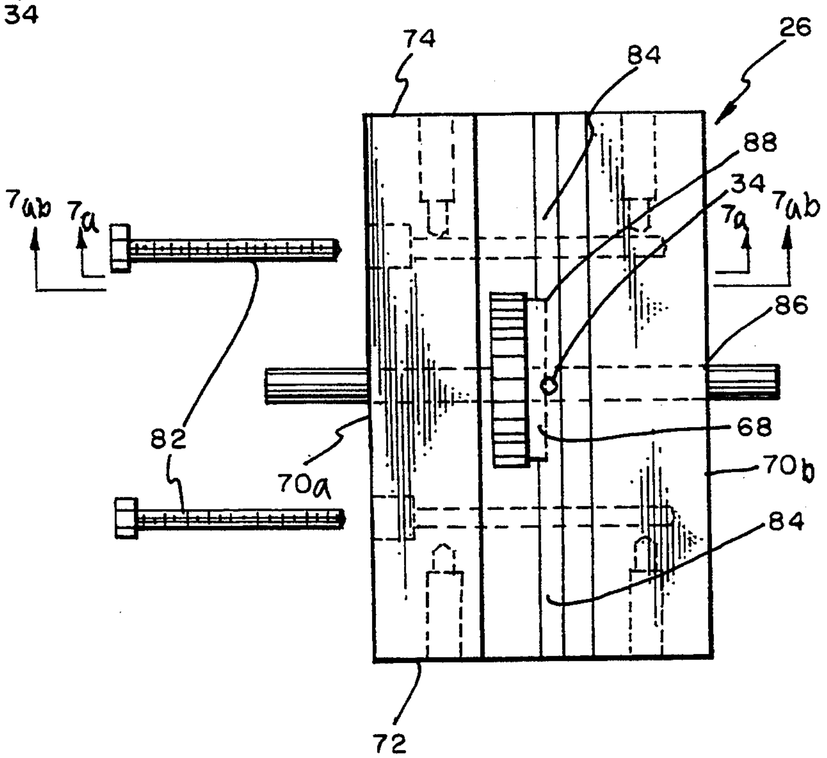
FIG. 7
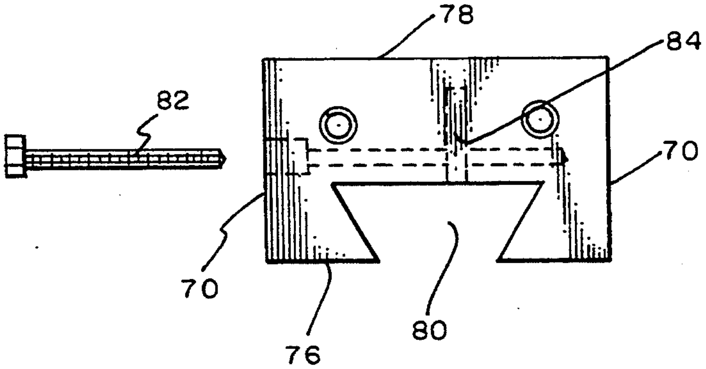
FIG. 7a
FIG. 7ab
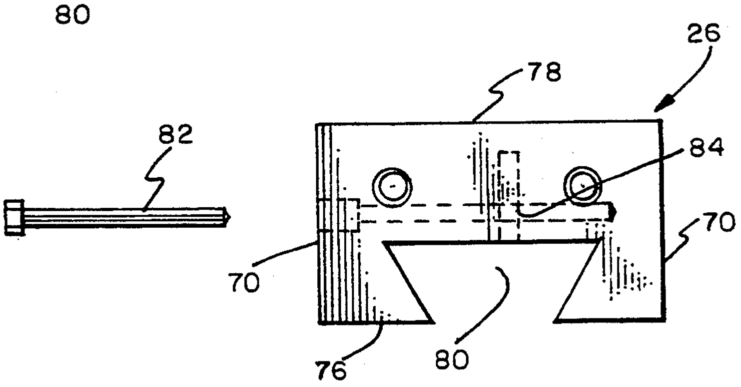

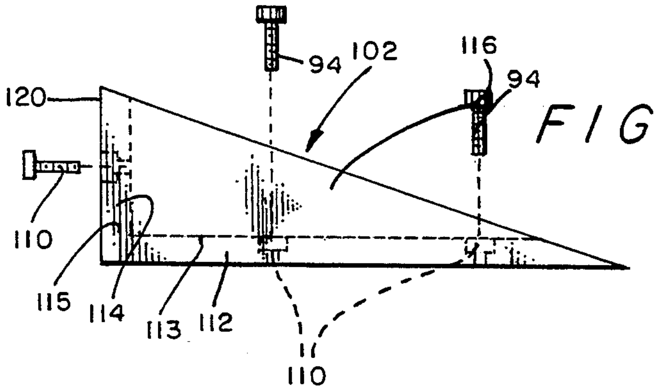
FIG. 10
FIG. 10a
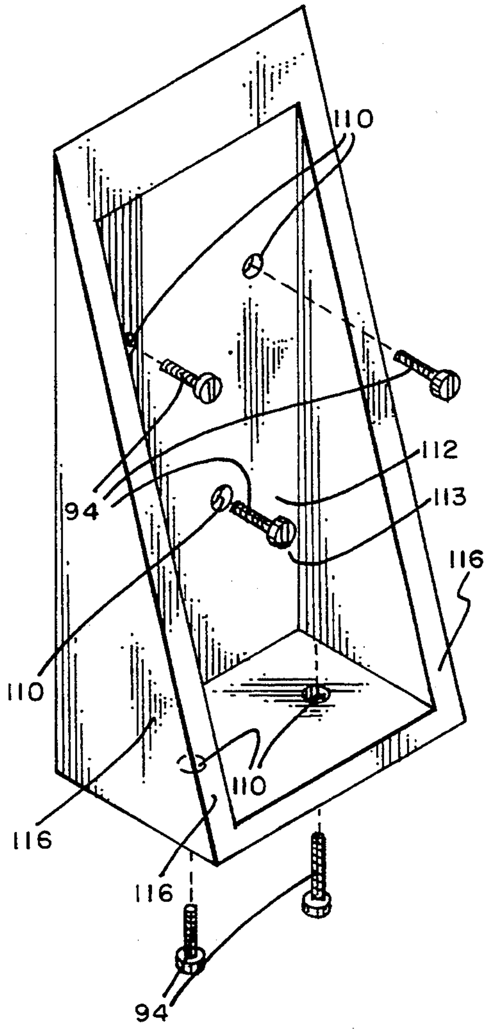
FIG. 10b
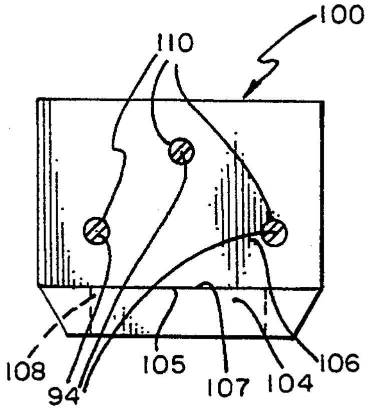
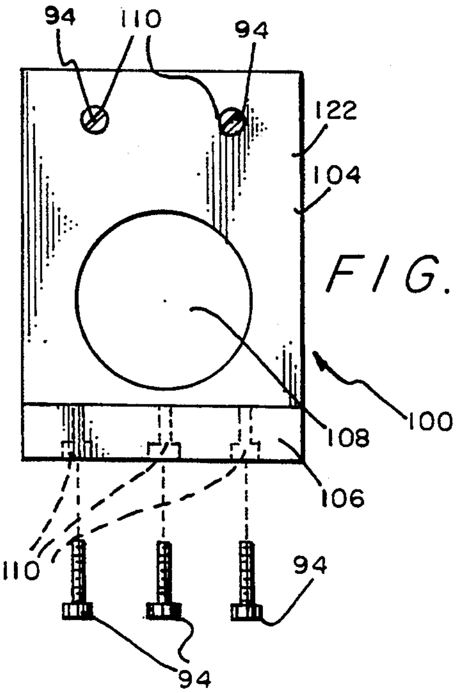
FIG. 10d
FIG. 10c
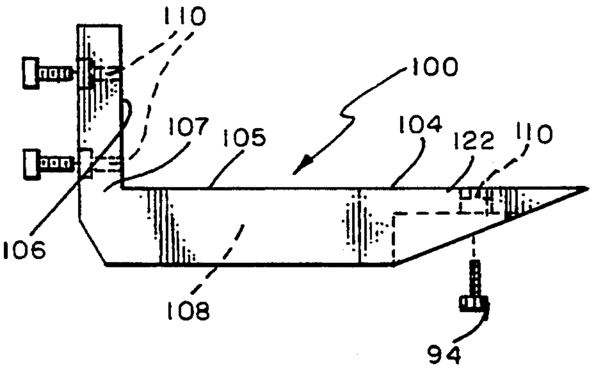

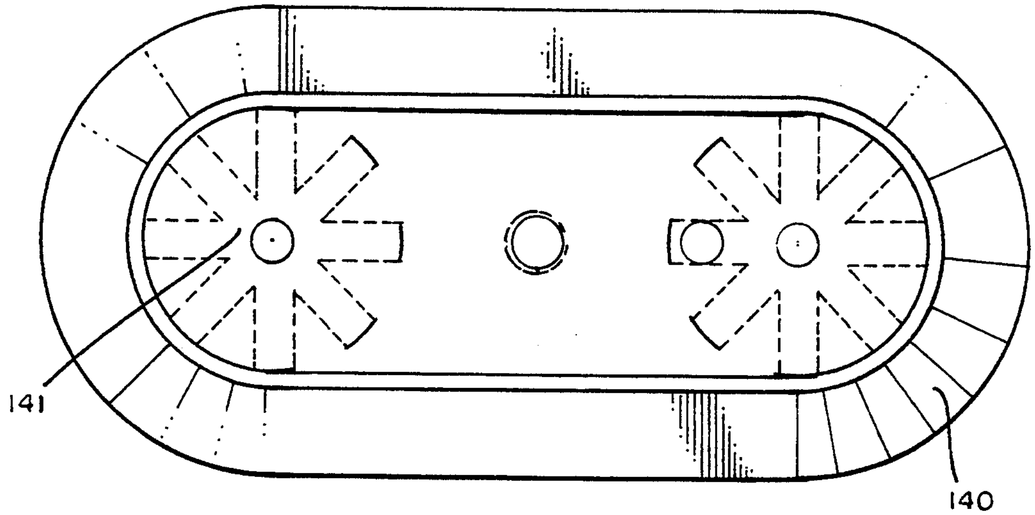
FIG. 16
FIG. 16a
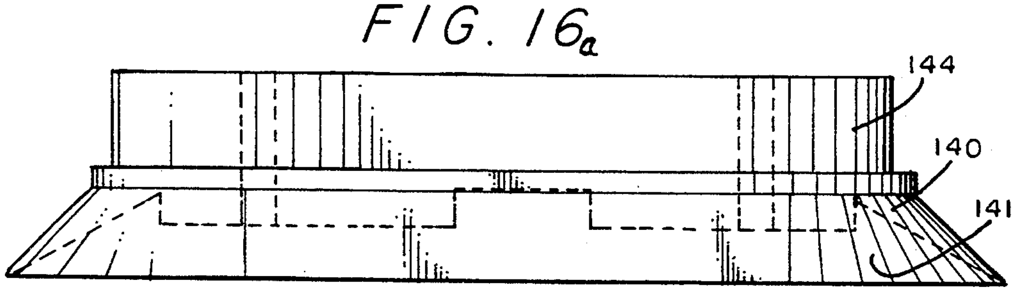
FIG. 17
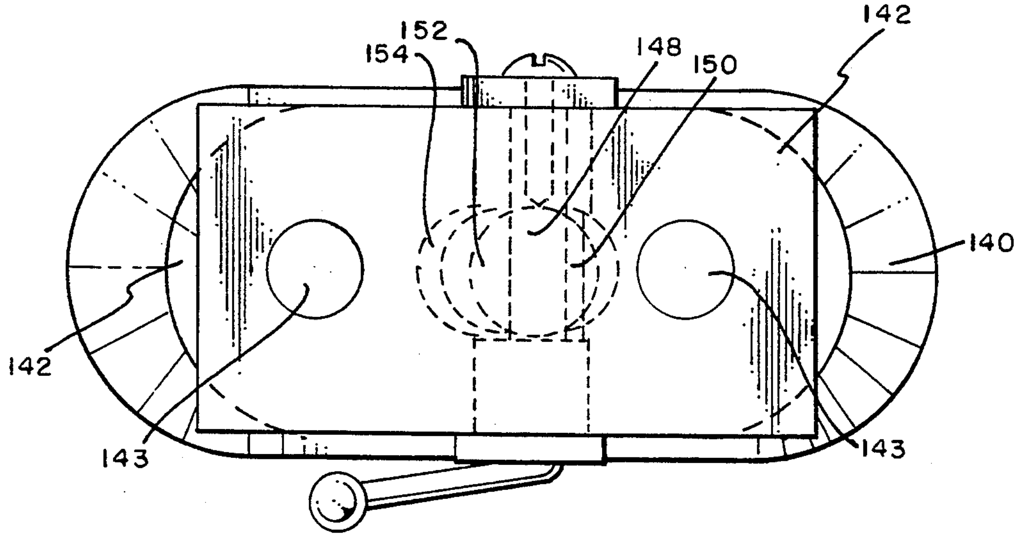

FIG. 20
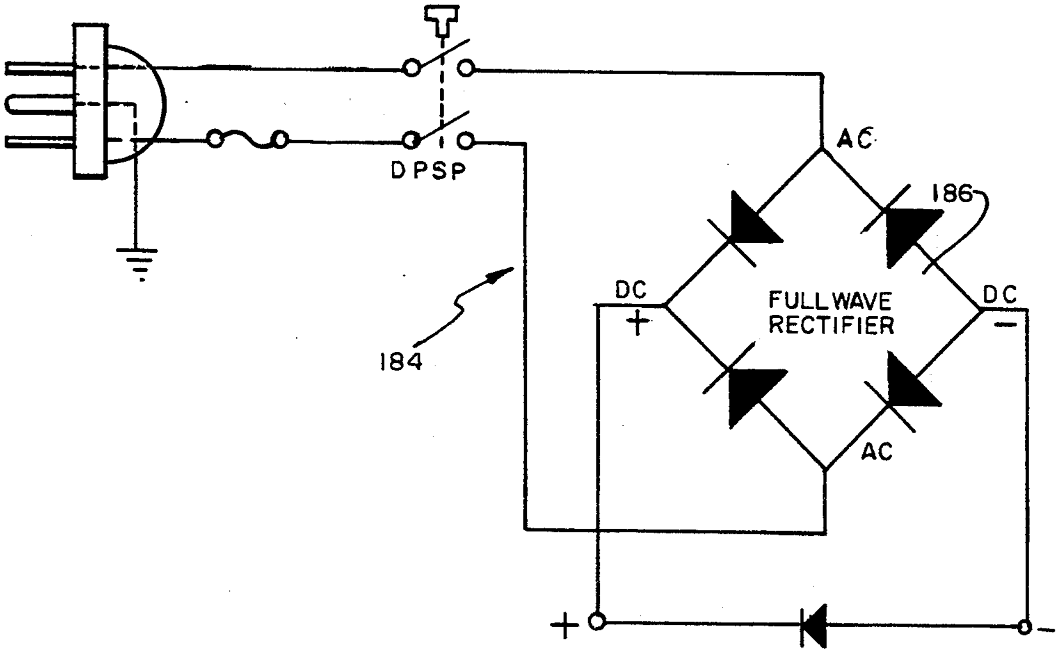
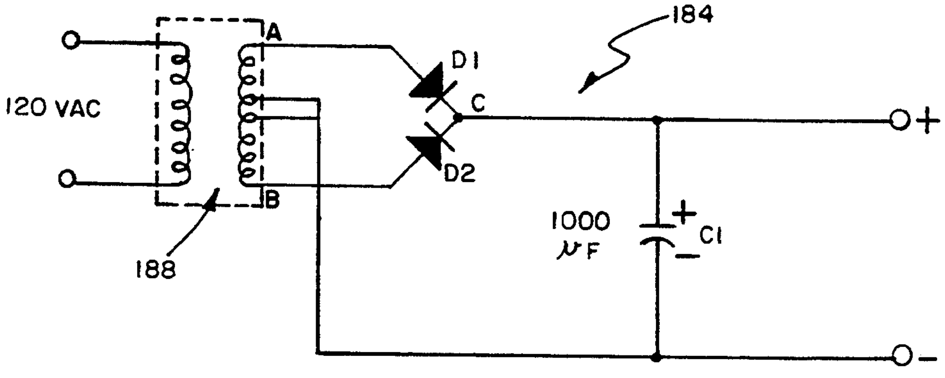
FIG. 20a

PORTABLE DRILL SUPPORT WITH A WORK SURFACE ENGAGING BASE

FIELD OF THE INVENTION

The present invention relates to drill supports. More specifically the present invention relates to portable drill supports with a base that secures to a variety of work surfaces.

DESCRIPTION OF THE PRIOR ART

A patentability investigation was conducted and the following U.S. Patents by numbers were discovered: U.S. Pat. No. 2,821,875 to Buck; U.S Pat. No. 2,932,194 to Buck; U.S. Pat. No. 2,938,411 to Herfurth; U.S Pat. No. 3,044,321 to Buck; and U.S. Pat. No. 3,044,324 to Buck. None of the foregoing prior U.S. Patents teach or disclose the particular drill support apparatus and/or method of the present invention.

SUMMARY OF THE INVENTION

This invention accomplishes its desired objects by providing a drill support with a work surface engaging base comprising a base, a body secured to and supported by the base; a saddle member movably disposed on the body, and a drill engaged to the saddle member for moving therewith. The base of the drill support comprises a first foot member coupled to a second foot member. The first foot member comprises a first suction duct in communication with a suction pump; the second foot member comprises a second suction duct in communication with the first suction duct. A suction foot is secured to the second foot in communication with the second suction duct for securing the base to a work surface by means of a vacuum generated therein by the suction pump. The body of the drill support comprises a pair of opposed generally L-shaped sides secured to a bottom. A first end member is secured to the bottom and to the generally L-shaped sides and a first top is secured to the generally L-shaped sides and to the first end member. A second end member is secured to the bottom and to the generally L-shaped sides and a second top is secured to the generally L-shaped sides and to the second end member. A partition member is secured to the generally L-shaped sides, to the first top member, and to the second top member. A longitudinal lip is secured to the first end member such that the combination of the first end member and the longitudinal lip comprises a male dove-tail protrusion joint, and the longitudinal lip additionally comprises a gear rack aligned with and flushed with an outer edge of the longitudinal lip.

The saddle member of the drill support comprises a pair of opposed walls secured to a bottom with a top secured to the opposed walls. A first end wall is secured to the top, to the bottom, and to the opposed walls. Similarly, a second end wall is secured to the top, to the bottom, and to the opposed walls. A pair of dove-tail protrusions are formed in the first end wall and a shaft is rotatably disposed in the saddle member such that the shaft extends from one of the opposed walls to another of the opposed walls. A saddle actuator handle is secured to one end of the shaft. A tensioning cutout is disposed in the first end wall and a gear cutout is also disposed in the first end wall. A gear is coupled to the shaft such that the gear is situated in the gear cutout.

The drill of the drill support comprises a drill motor having a chuck. The drill motor additionally comprises a yoke means secured thereto for securing the drill motor to the saddle member. In a similar fashion, a mount block means is secured to the drill motor for securing the drill motor to the saddle member. The yoke means comprises a first yoke plate member and a second yoke plate member secured such that the first yoke plate member and the second yoke plate member define a structure that is generally L-shaped, wherein the first yoke plate member comprises an aperture disposed therein for slidably receiving the chuck. The mount block means comprises a first plate member and a second plate member secured such that the first plate member and the second plate member define a structure that is generally L-shaped, and a pair of opposed brace members secured to the first plate member and the second plate member. The yoke means and the block mount means are secured to the drill motor such that the yoke means and the block means define a saddle opening therebetween for slidably receiving the saddle member.

This invention further accomplishes its desired objects by providing a method for drilling by providing a drill support comprising a body, a saddle member for securing a drill to the body, and a drill having a chuck and disposing the drill on the saddle member of the drill support such that the drill is in a generally vertical position with the chuck of the drill pointed in a downward direction. Then, after drilling with the drill, stopping, removing the drill from the saddle member and redisposing the drill on the saddle member such that the drill is in a generally vertical position with the chuck of the drill pointed in an upward direction then drilling with the drill.

It is therefore an object of the invention to provide a drill support and method for drilling. These, together with the various ancillary objects and features which will become apparent to those skilled in the art as the following description proceeds, are attained by this novel portable drill support with a work surface engaging base, a preferred embodiment being shown with reference to the accompanying drawings, by way of example only, wherein:

BRIEF DESCRIPTION OF THE DRAWINGS

FIG. 3 is a top plan view of the drill support with the drill motor removed therefrom;

FIG. 4 is a perspective view of the shaft member of the drill support;

FIG. 5 is a vertical sectional view taken in direction of the arrows and along the plane of line 5—5 in FIG. 3;

FIG. 6 is a top plan view of the saddle member of the drill support with the saddle actuator handle removed therefrom;

FIG. 7 is a front elevational view of the saddle member of the drill support with the saddle actuator handle removed therefrom and disclosing the tensioning bolts;

Figure 8:
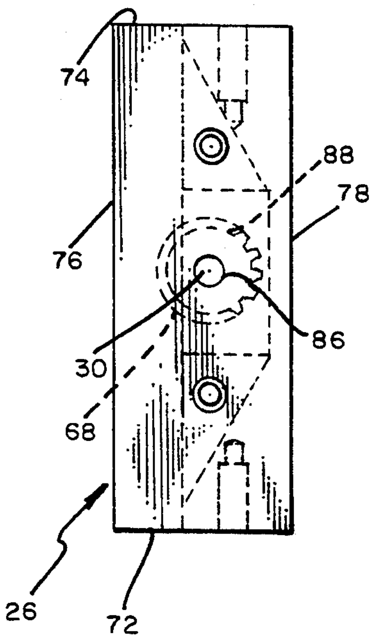
Figure 9:
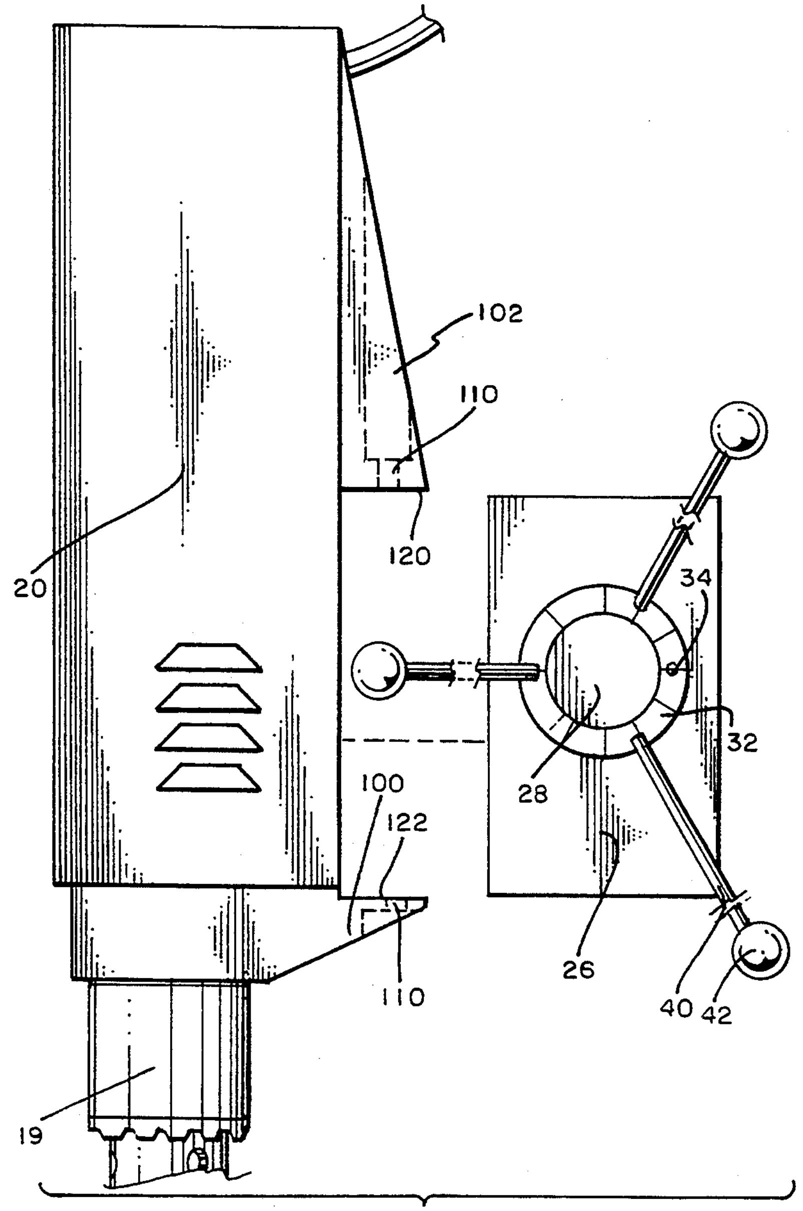
Figure 11:
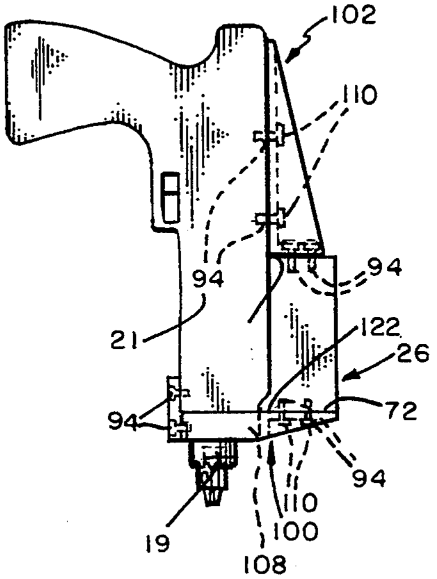
Figure 12:
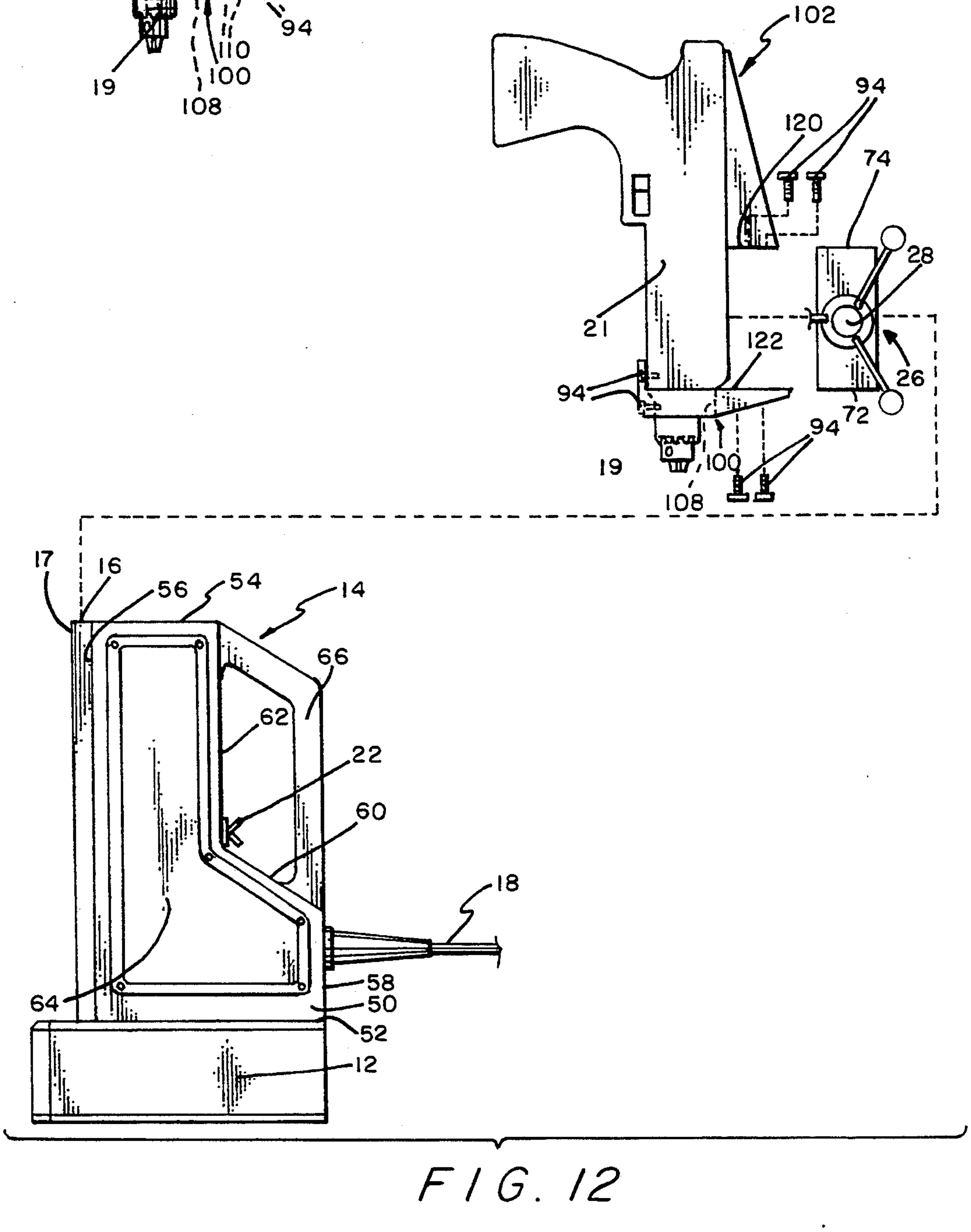
Figure 13:
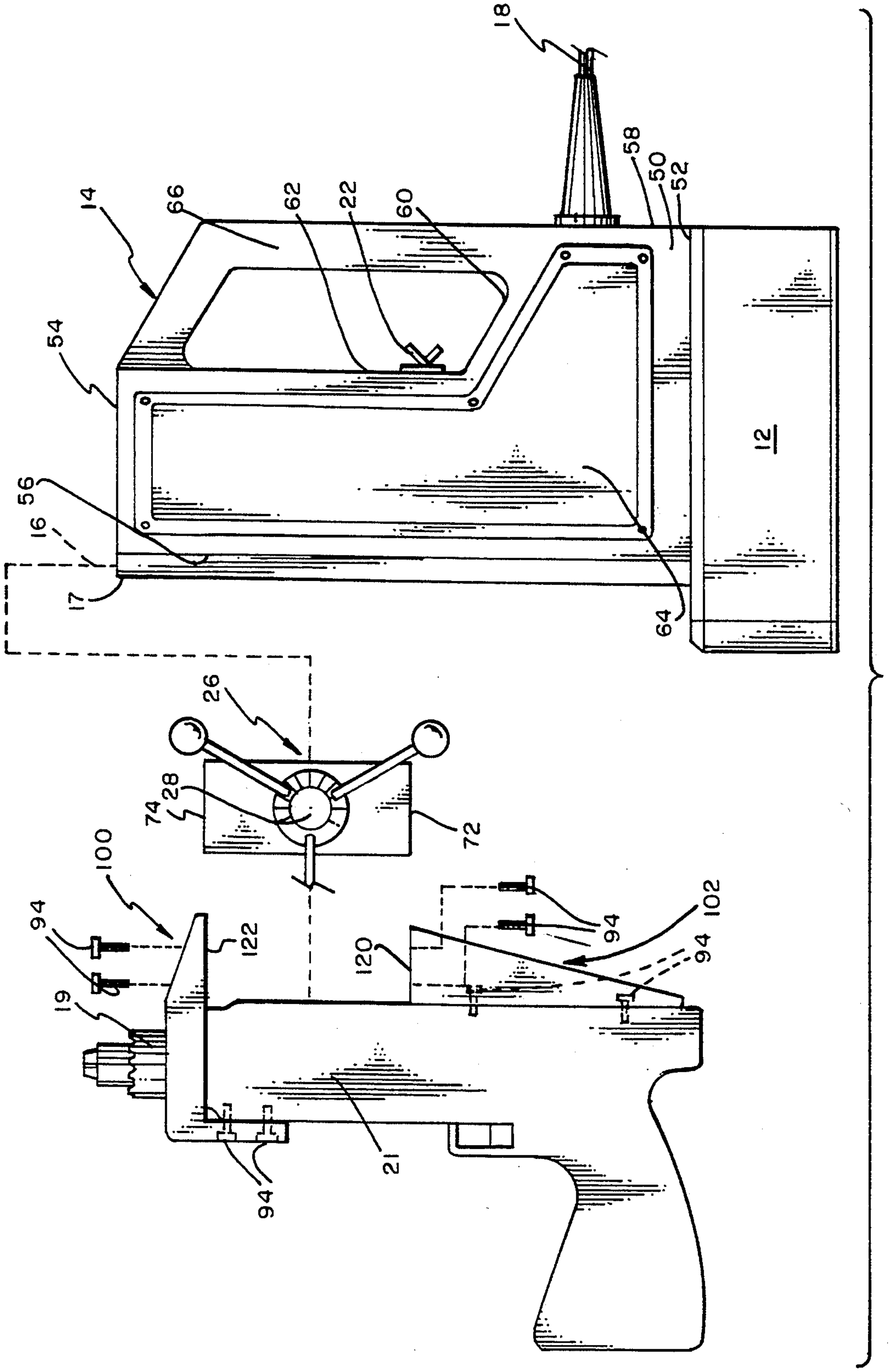
Figure 15:
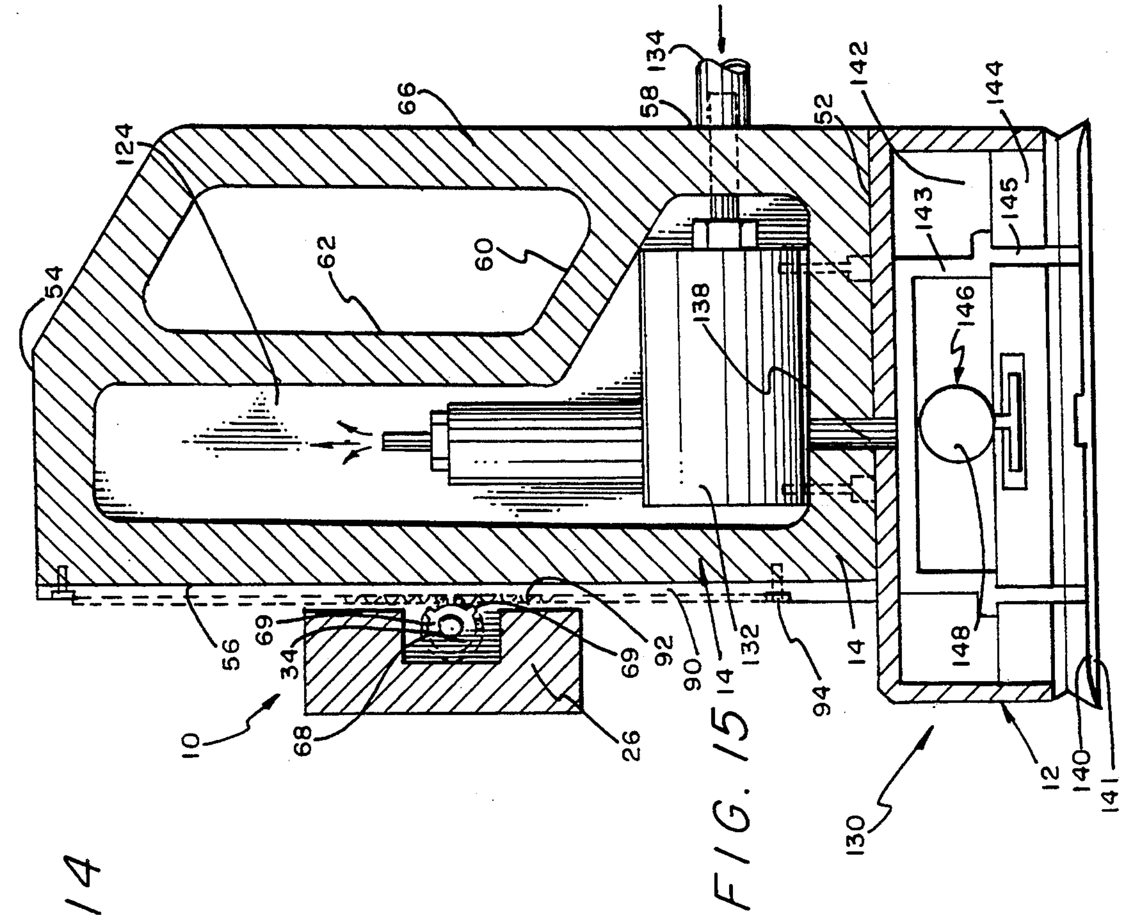
Figure 14:
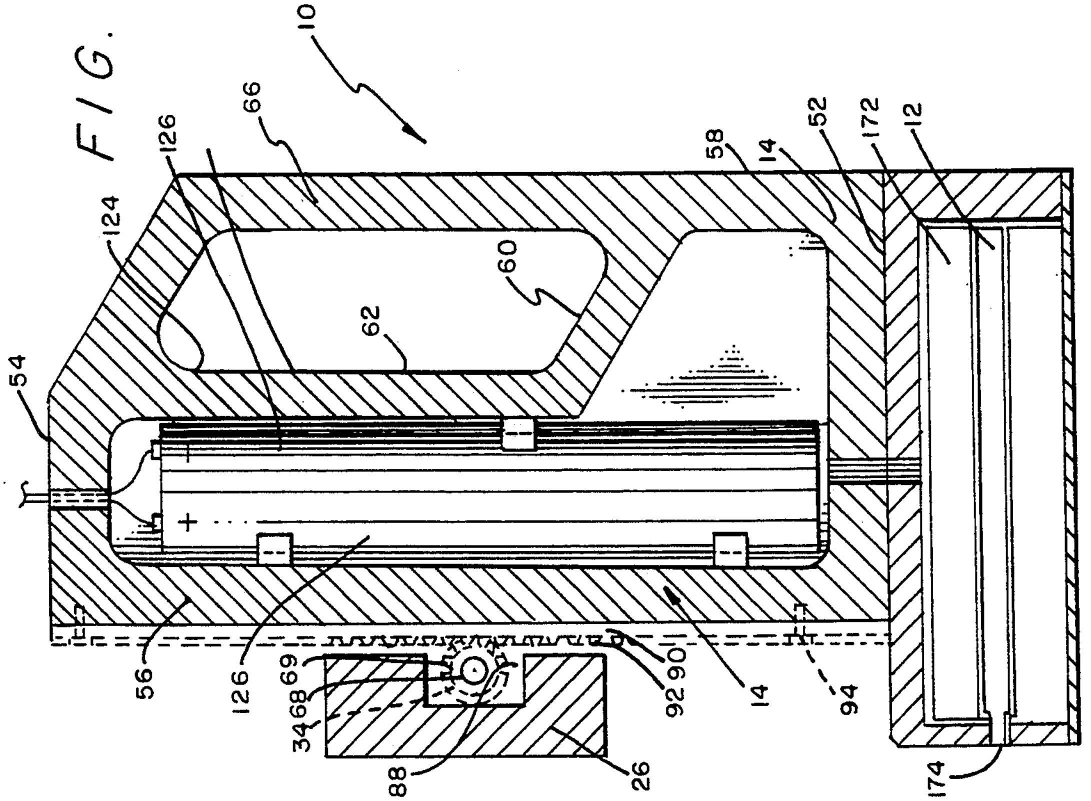
Figure 17A:
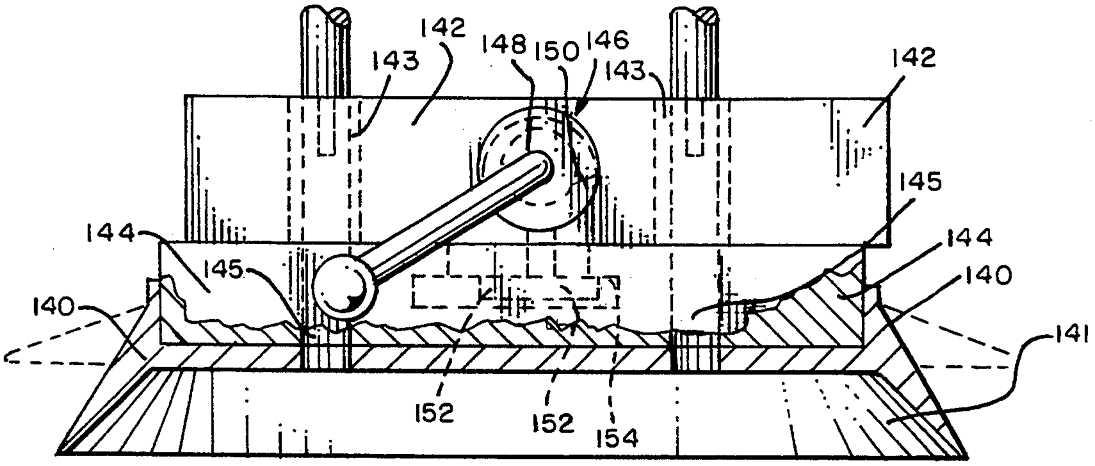
Figure 18:
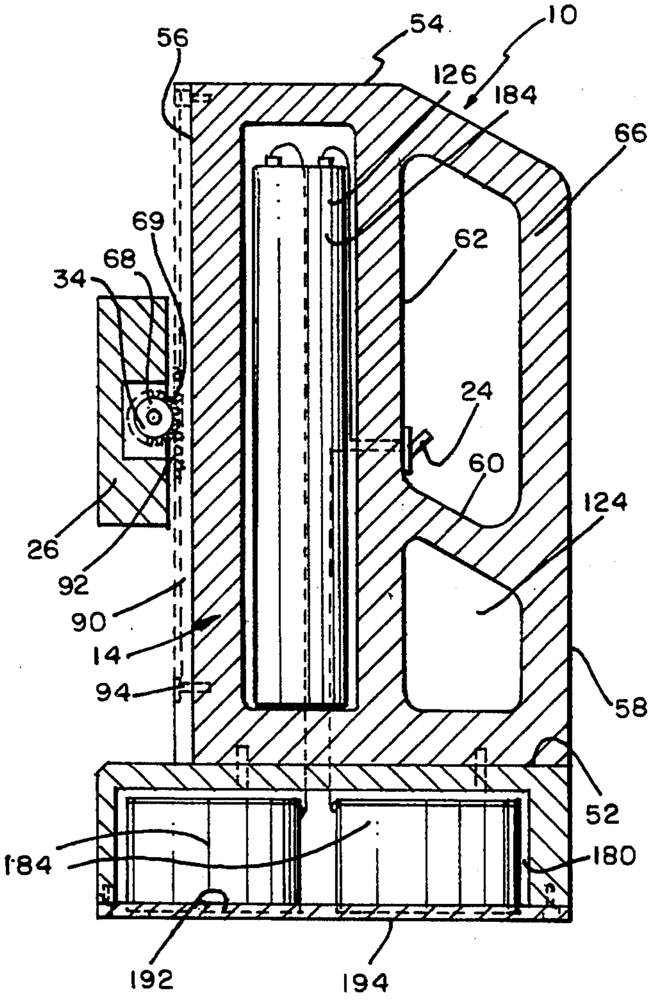
Figure 19:
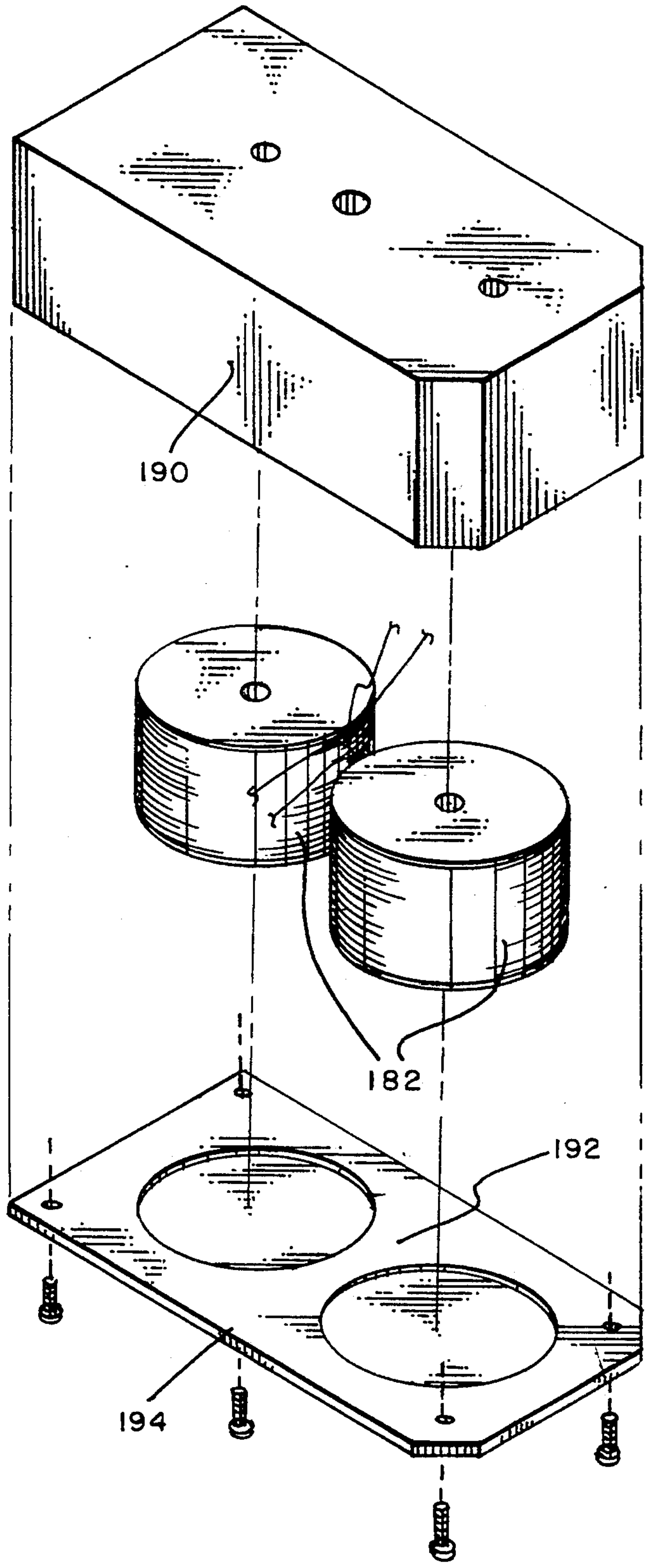
Figure 21:
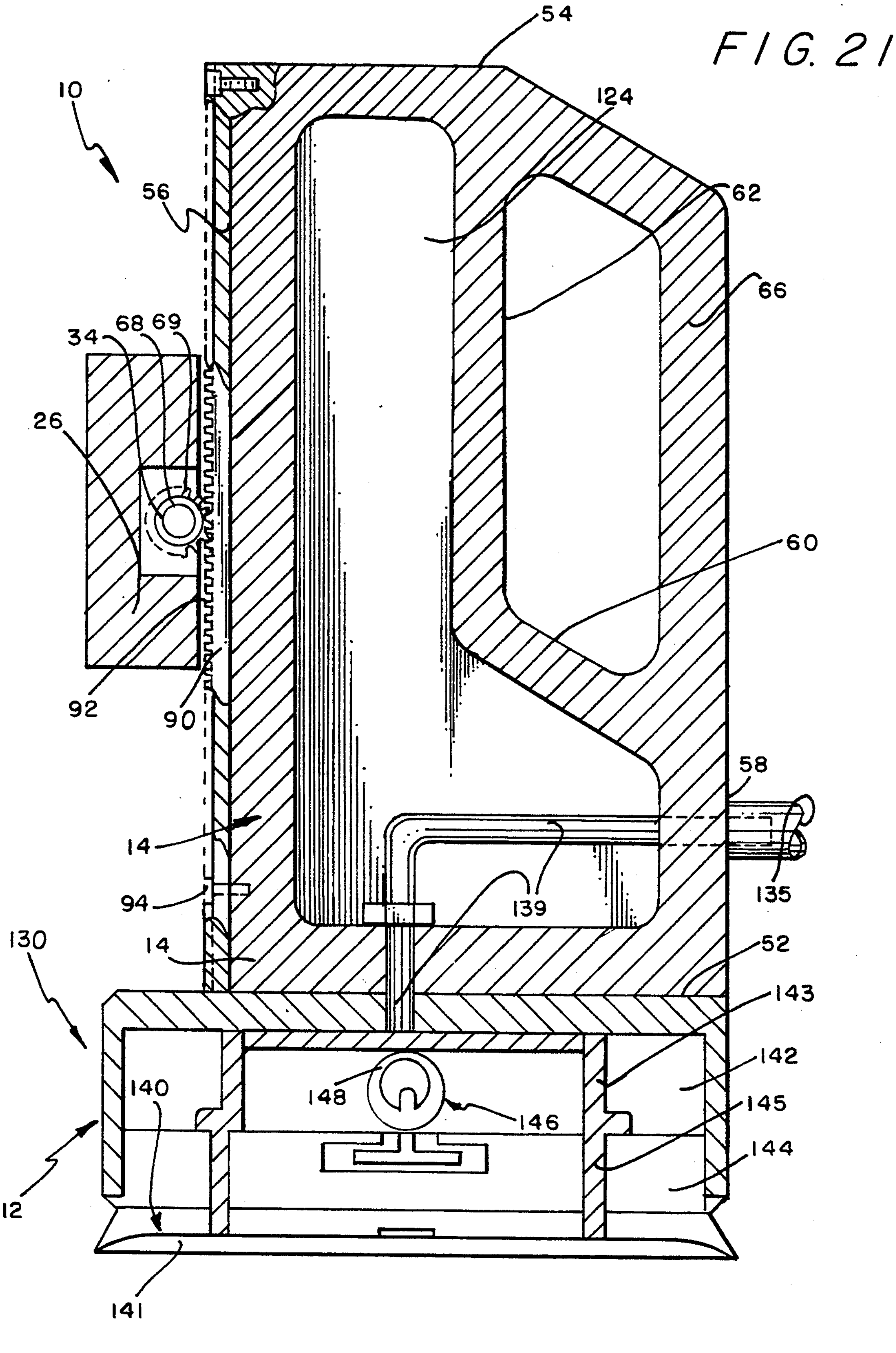

FIG. *7a* is a horizontal sectional view taken in direction of the arrows and along the plane of line *7a—7a* in FIG. 6;

FIG. *7ab* is a horizontal sectional view taken in direction of the arrows and long the plane of line *7ab—7ab* in FIG. 6 disclosing the action of the cutout in a compressed mode/posture;

FIG. 8 is a side elevational view of the saddle member of the drill support with the saddle actuator handle removed therefrom;

FIG. 9 is side elevational view of the drill motor separated from the saddle member of the drill support;

FIG. 10 is side elevational view of the drill motor mount block means and the bolt members;

FIG. 10*a* is a front elevational view of the drill motor mount block means and the bolt members;

FIG. 10*b* is a rear elevational view of the drill motor yoke means and the bolt members;

FIG. 10*c* is a side elevational view of the drill motor yoke means and the bolt members;

FIG. 10*d* is a top plan view of the drill motor yoke means and the bolt members;

FIG. 11 is a side elevational view of the retro-fit drill motor wherein the drill motor mount block means and the drill motor yoke means are secured to the retro-fit drill motor and the saddle member;

FIG. 12 is a partial segmented side elevational view of the retro-fit drill motor, the saddle member, and the drill support wherein the saddle member is removed from the drill support and from the retro-fit drill motor;

FIG. 13 is a partial segmented side elevational view of the retro-fit drill motor, the saddle member, and the drill support wherein the saddle member is removed from the drill support and from the retro-fit drill motor, and wherein the drill motor is shown in an inverted position;

FIG. 14 is a vertical cross sectional view of the drill support with the drill motor removed therefrom, disclosing the permanent magnet disposed in the base and the battery disposed in the body cavity;

FIG. 15 is a vertical cross sectional view of the drill support with the drill motor removed therefrom, disclosing the suction assembly and cam lock assembly of the base and the suction pump disposed in the body cavity;

FIG. 16 is a bottom plan view of the suction foot member;

FIG. 16*a* is a side elevational view of the suction foot member and the second foot member;

FIG. 17 is a top plan view of the suction assembly and cam lock assembly removed from the drill support;

FIG. 17*a* is a side elevational view of the suction assembly and cam lock assembly removed from the drill support;

FIG. 18 is a vertical cross sectional view of the drill support with the drill motor removed therefrom, disclosing the battery disposed in the body cavity and the wire coils of the electro-magnet disposed in the base;

FIG. 19 is an exploded view of the electro-magnet disposed in the base of the drill support of FIG. 19;

FIG. 20 is a schematic diagram of an AC to DC power supply such as may be used in an electro-magnet; and FIG. 20*a* is a schematic diagram of an AC to DC power supply such as may be used in an electro-magnet;

FIG. 21 is a vertical cross sectional view of the drill support with the drill motor removed therefrom, disclosing a coupling for an external vacuum source.

DETAILED DESCRIPTION OF THE INVENTION

Figure 1:
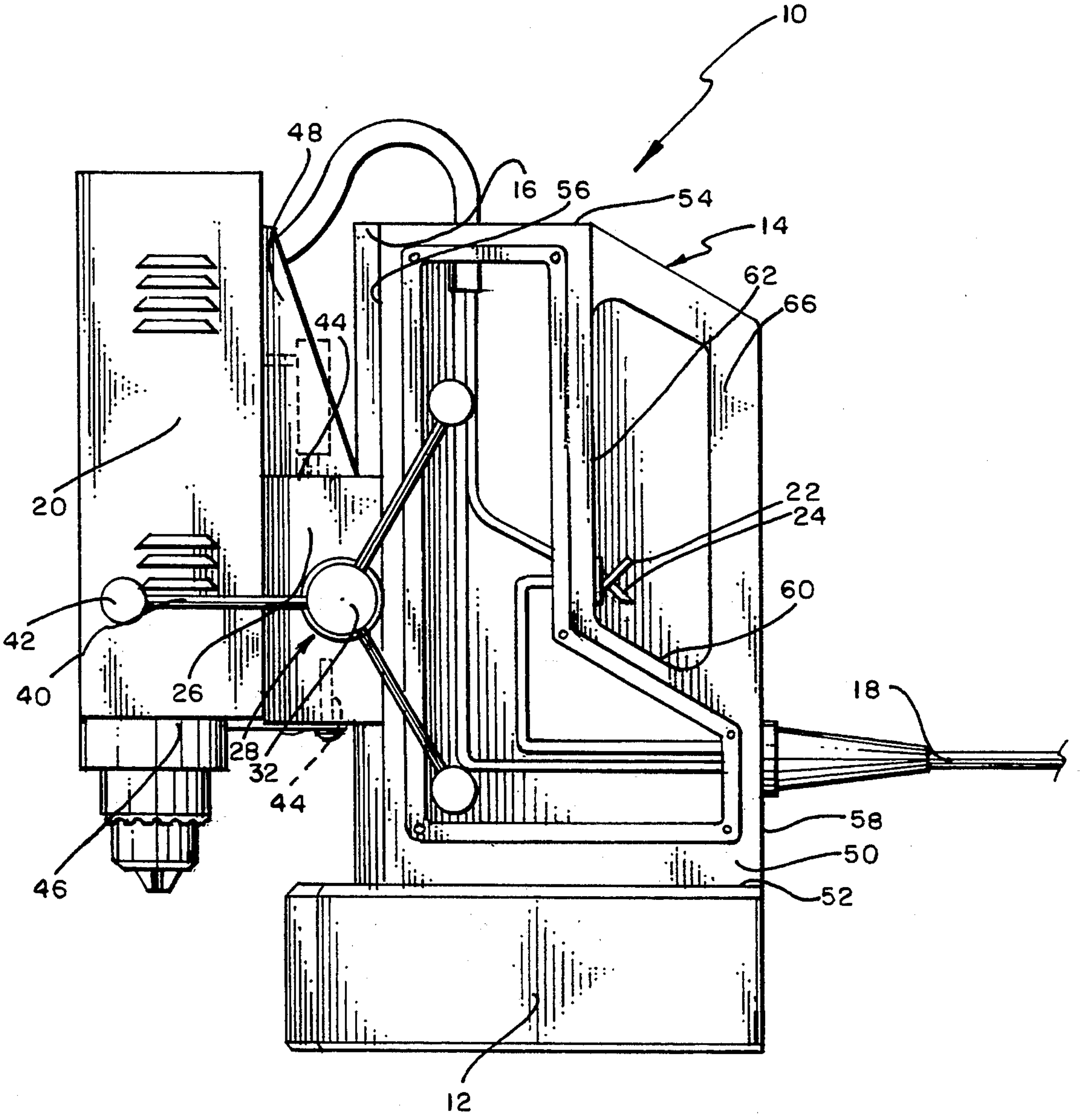
FIG. 1 is a side elevational view of the drill support.

Turning now to the drawings wherein like parts of the invention are identified by like reference numerals, there is seen, as best shown in FIG. 1 a drill support, generally illustrated as 10. The drill support comprises a base 12, a body 14 secured to and supported by said base 12, a saddle member 26 for securing a drill 20 to the body 14, a saddle actuator handle 28 coupled to the saddle 26, and at least one electrical switch 22 for activating the drill motor 20. In one embodiment, the drill support may comprise several electrical switches 22–24 to operate the drill motor 20 and any other electrical device (not shown in the drawings).

The drill support 10 may be formed from any suitable material that is suitable for use as a support, preferably a strong and durable material, such as iron or steel. The drill support 10 may be constructed from an aluminum alloy or a plastic mold in order to minimize its weight and thereby enhance portability and ease of use. The body 14 of the drill support comprises a bottom 52; and a pair of generally L-shaped sides 50—50 secured to said bottom 52. A first end member 56 is secured to said bottom 52 and to the generally L-shaped sides 50—50; and a first top 54 is secured to the generally L-shaped sides 50—50 and the first end member 56. Secondly, a second end member 58 secured to the bottom 52 and to the generally L-shaped sides 50—50; and a second top 60 is secured to the generally L-shaped sides 50—50 and to the second end member 58. A partition member 62 is also secured to the generally L-shaped sides 50—50, to the first top member 54, and to the second top member 60. Additionally, a generally L-shaped handle 66 is generally integrally secured to the support body 14 such that it is formed therefrom. The handle 66 is secured to the partition member 62 and to the first top member 60.

Figure 2:
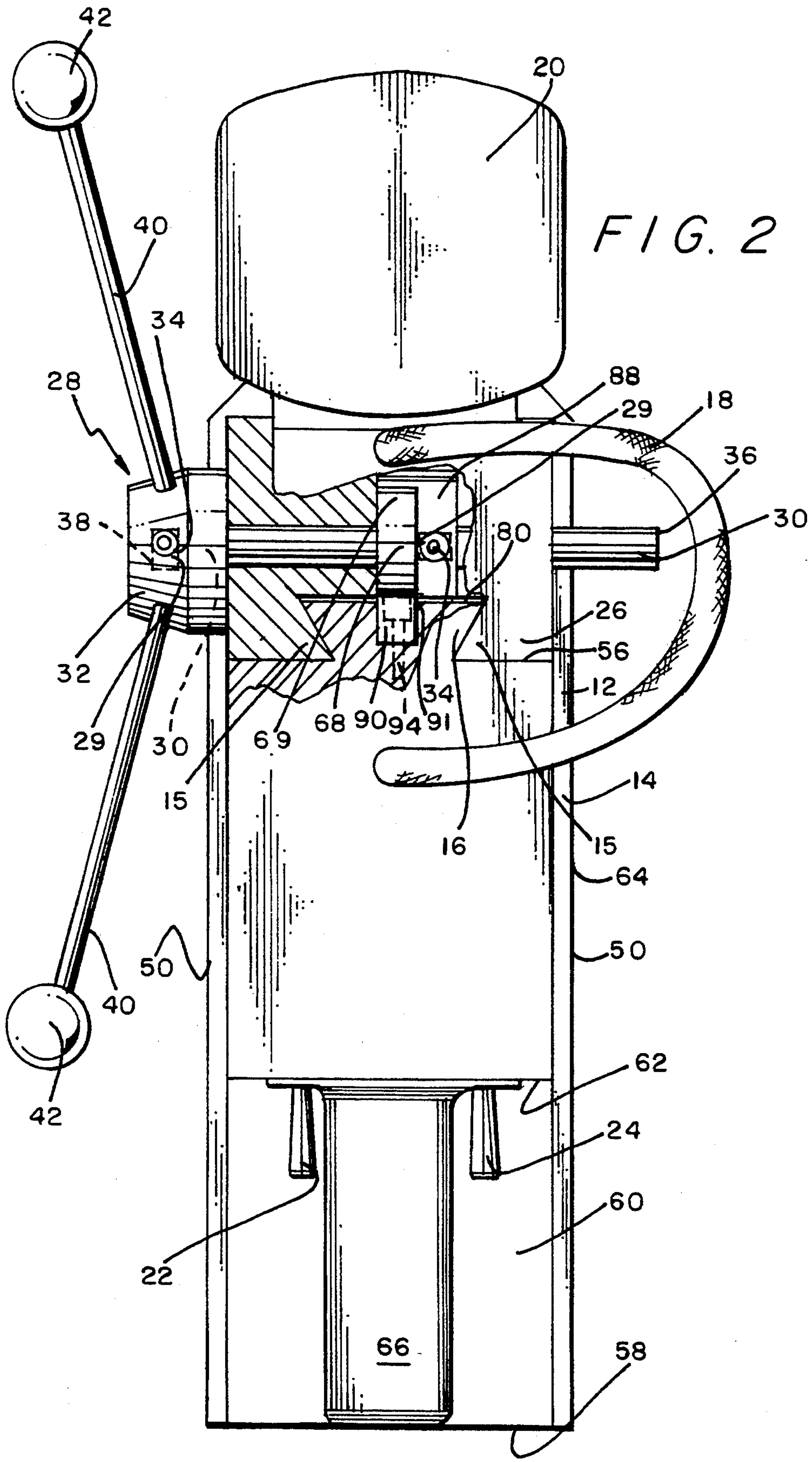
FIG. 2 is a top plan partial cutaway view of the drill support wherein the cutaway of the saddle member reveals the gear member.

A longitudinal lip member 16 is secured to the first end member 16 such that the longitudinal lip member 16 traverses the longitudinal length of the first end member 56 and is opposed by a pair of dove channels 15—15. The longitudinal lip member 56 defines a structure comprising a male dove-tail protrusion joint (as viewed in a horizontal by top plan view, see FIG. 3). The longitudinal dove-shaped lip member 16 slidably engages the saddle member 26. FIG. 5 shows a gear rack 90 generally secured along the length of longitudinal lip member 16. Gear rack 90 is situated such that the outer face 92 of gear rack 90 is generally aligned with and flushed with the outer edge 17 of the longitudinal lip member 16. The outer face 92 of the gear rack 90 includes a plurality of tooth members 91. Gear rack 90 may be secured to the longitudinal lip member 16 by a pair of bolt members 94—94 in one embodiment. Alternatively, the support body 14 may integrally define a structure comprising the gear rack 90. The gear rack 90 engages a gear member 68 that is disposed in saddle member 26. The gear member 68 has a plurality of teeth 69 and is secured to a generally cylindrical shaft member 30 by a set screw member 34. The shaft member 30 is rotatably disposed in saddle member 26 such that the plane of rotation of shaft member 30 is generally normal or perpendicular to the generally L-shaped sides 50—50. As shown in FIG. 2, a shaft end piece 32 is secured to a first end 38 of the shaft member 30 by a set screw member 34. Additionally, at least one lever member 40 is secured to the shaft end piece 32. Each lever member 40 comprises a lever end piece 42 secured to the end of each lever member 40. The combination of the shaft end piece 32 and the lever member 40 comprise the aforementioned saddle actuator handle 28. Additionally, the saddle actuator handle 28 may be removed from end 38 and secured to a second end 36 of the shaft 30 as necessary for easy access by a left-handed person. The saddle actuator handle 28 rotates the shaft member 30, which in turn rotates the gear member 68 secured or keyed thereto. As previously indicated, the plurality of tooth members 69—69 define the outer circumference of the gear member 68. The tooth members 69—69 mesh with a plurality of tooth members 91—91 that comprise the outer face 92 of the gear rack 90. When the shaft member 30 is rotated, preferably by the saddle actuator handle 28, the meshing of the tooth members 69—69 of the gear member 68 and the tooth members 91—91 of the gear rack 90 force the saddle member 26 to move either upwardly or downwardly and in a longitudinal direction along lip member 16.

The saddle member 26 is slidably coupled and/or engaged to the longitudinal dove-shaped lip member 16, such that it may slide along the entire length of longitudinal lip member 16 in the operation of the invention. As shown in FIGS. 6–8, the saddle member 26 comprises a pair of opposed wall members 70—70 secured to a bottom member 72; a top member 74 secured to the opposed wall members 70—70; and a first end wall member 76 secured to the top member 74, to the bottom member 72 and to the opposed wall members 70—70. A second end wall member 78 is secured to the top member 74, to the bottom member 72, and to the opposed end wall members 70—70. Referring now to FIG. 6, there is seen a female dove tail recess 80 (in a horizontal plan view) disposed in the first end wall 76 of the saddle member 26. The female dove tail recess 80 is partially delineated by a pair of opposed dove protrusions 80*a* and 80*b*. The female dove tail 80 recess slidably engages the longitudinal lip member 16 of support body 14, as mentioned above (see FIG. 3), such that the dove protrusions 80*a* and 80*b* slidably lodge in dove channels 15—15 such that the saddle member 26 may slide along the length of the longitudinal lip member 16 without separating therefrom. Saddle member 26 preferably may be fabricated from a material that has load-bearing properties such that excessive lubrication of the longitudinal lip member 16 (see FIG. 16) and the female dove tail recess (see FIG. 6) is unnecessary. An example of one such material is one sold under the trade mark NYLATRON®. Use of such a material negates the need for washers, bearings, and the like, as such material provides a sufficiently smooth surface whereby, with moderate lubrication, the surface itself becomes a load bearing member. The movement of saddle member 26 along longitudinal lug 16 is tensioned by a pair of bolt members 82—82 rotatably disposed in and through and/or into one of the opposed side wall members 70. Bolt members 82—82 may each be tightened as desired to adjustably clamp down or squeeze or collapse the female dove tail recess 80 of saddle member 26 on and against the longitudinal lip member 16 to increase the tension or frictional engagement the female dove tail recess 80 imposes on the longitudinal lip member 16. Such tightening of the bolt members 82—82 thereby restricts the sliding action of the saddle member 26 along the longitudinal length of the longitudinal lip member 16. As shown in FIG. 7*ab*, a cutout 84 is disposed in saddle member 26 to allow a small degree of flexibility along wall member 78 so that the tightening of bolts 82—82 is effective and causes the cutout to partially close. The movement of saddle member 26 along the length of longitudinal lip 16 is controlled by a saddle actuator handle 28 that is coupled to the saddle member 26.

The previously mentioned shaft member 30 is rotatably disposed in an aperture 86 which is formed in saddle member 26. The aperture 86 is generally cylindrical (see FIGS. 7 and 8) and extends from one of the opposed wall members 70*a* (see FIG. 7) to the opposing wall member 70*b*. In one preferred embodiment, the shaft member 30 is rotatably coupled directly to the saddle member 26, without washers or bearings, due to the material used in construction of the saddle member 26. It is to be understood, however that a more conventional system of bearings or washers coupled to shaft member 30 will not depart from the spirit nor the method of the invention. A generally rectangular cutout 88 is situated in the female dove tail recess 80 of first end wall member 76 to accommodate the gear member 68. The cutout 88 is situated such that shaft member 30 passes through the cutout 88, thereby engaging the gear member 68 which is rotatably seated in the cutout 88. The set screw member 34 of gear member 68 is tightened sufficiently to prevent the gear member 68 from slipping on shaft member 30 (see FIG. 2). The shaft member 30 additionally comprises a plurality of recesses or cutouts 31—31 along and on a longitudinal surface 29 (see FIG. 4) of the shaft member 29, to prevent slippage of the set screw members 34—34 as they are tightened. Referring to FIG. 2, the shaft member 30 is rotatably disposed in the saddle member 26 and the gear member 68 is disposed and keyed thereon to rotate therewith, and set screw member 34 of gear member 68 is tightened such that it engages any of the cutouts 29 of the shaft member. The shaft member 30 is held in position in the saddle member 26 by rotatably passing through the saddle member 26 and by the gear member 68, which is secured to the shaft member 30, being geared to the gear rack 90. Saddle member 26 is movably disposed on the support body 14, such that the female dove tail recess 80 of saddle member 26 movably mates with the longitudinal lip member 16. Saddle actuator handle 28 is secured to the first end 38 of the shaft member 30 by tightening set screw member 34 thereto.

The saddle member 26 is designed to accommodate a variety of drill motors 20. To this end, a drill motor yoke means 100 provides a means for securing a drill motor 20 to the saddle member 26. A drill motor mount block member 102 is secured to the drill motor 20 for engaging and providing a means for securing the drill motor 20 to the saddle member 26 as shown in FIGS. 10, 10*d* and 11 (by way of example only) wherein a commercially available drill motor 20 is retro-fitted with the drill motor yoke means 100 and with the drill motor mount block means 102 to fit the saddle member 26 and the associated drill support 10 coupled thereto. In the embodiment pictured in FIGS. 10, 10*d* and 11, a drill motor 21 is provided to be retro-fitted to the drill motor yoke means 100 and to the drill motor mount block means 102 (see FIG. 11). The drill motor yoke means 100 (see FIG. 10*c*) comprises a pair of plate members (i.e. a first plate member 104 and a second plate member 106) secured to each other at one end, defining a structure that is generally L-shaped in a side elevational view or in a vertical cross section. Stated alternatively and more specifically, the first plate member 104, comprising a face 105, is secured to an edge 107 of second plate member 106, such that the plate members 104–106 comprise a structure that is generally L-shaped in with plate members 104–106 being in a normal relationship. The first plate member 104 comprises an aperture 108 disposed in face 105 such that a chuck 19 of a drill motor 21 may pass therethrough (see FIGS. 10*d* and 11). A plurality of bolt hole apertures 110 is disposed in the first plate member 104 and the second plate member 106 each for slidably receiving a plurality of the bolt members 94. The drill motor yoke means 100 is secured to the drill motor 21, as best shown in FIG. 11, by disposing the drill motor yoke means 100 on the drill motor 21, disposing the bolt members 94 through the plurality of bolt hole apertures 110, and tightening the bolt members 94 thereto. In a similar fashion, the drill motor mount block means 102 (pictured in FIGS. 10 and 10*a*) comprises a first plate member 112 secured to a second plate member 114. The first plate member 112 comprises a face 113 which is secured to an edge 115 of the second plate member 114. The combination of the plate members 112–114 define a structure comprising a shape that is generally L-shaped. In addition, a pair of opposed brace members 116—116 is secured to the plate members 112–114, thereby adding strength to the plate members 112–114. The drill motor mount block means 102 comprises another plurality of bolt hole apertures 110 wherein each aperture 110 disposed therein slidably receives a bolt member 94. The drill motor mount block means 102 is secured to the drill motor 21, as shown in FIG. 11, by disposing the drill motor mount block means 102 on the drill motor 21, disposing the bolt members 94 in each aperture 110 of the plurality of apertures 110—110, and tightening the bolt members 94 to the drill motor 21. Thus the commercially available drill motor 21 may be retro-fitted to the saddle member 26 of the drill support 10.

In one preferred embodiment, the drill motor 20, as shown in FIGS. 1 and 9, defines a structure comprising the drill motor yoke means 100 and the drill motor mount block 102 as presented above wherein the drill motor yoke means 100 and the drill motor mount block means are formed with and/or from the housing of the drill motor 20. Stated alternatively, the drill motor 20 has a housing 118 wherein the drill motor yoke means 100 and the drill motor mount block means 102 is already secured thereto, rather than retro-fitted thereto. In this embodiment, the drill motor 20 is commercially supplied or manufactured for use with the drill support 10. For the particular embodiment of drill motor 20 used (e.g. either drill motor 20 (FIG. 9) or drill motor 21 (FIG. 11)) the saddle member 26 engages the drill motor yoke means 100 and the drill motor mount block means 102 in the same fashion. The drill motor mount block means 102 and the drill motor yoke means 100 each comprises an edge 120 and an edge 122, respectively, which slidably engage and sandwiches saddle member 26 along the top member 74 and the bottom member 72 of the saddle member 26. One of the salient features of the invention resides in the combination of the saddle member 26, the drill motor mount block means 102, and the drill motor yoke means 100. As best shown in FIGS. 12 and 13, the saddle member 26 may be secured to the drill motor mount block means 102 such that the top member 74 of the saddle member 26 is secured to the top edge 120 of the drill motor mount block means 102 and bottom member 72 of the saddle member 26 is secured to the top edge 122 of the drill motor yoke means 100 (see FIG. 12). In this configuration, the chuck 19 of the drill motor 21 is positioned such that the direction of the drilling action is directed towards the base 12 of the drill support 10. Alternatively, as shown in FIG. 13, the top edge 120 of the drill motor mount block means 102 may be secured to the bottom member 72 of the saddle member 26 and the top edge 122 of the drill motor yoke means 100 to the top member 74 of the saddle member 26, such that the chuck 19 of the drill motor 21 is directed away from the base 12 of the drill support 10. This feature is important because it allows the user of the drill support 10 to easily drill with precision in a position on the work surface that would otherwise be rather difficult.

The base 12 of the drill support may be manifested or seen in any one of several embodiments, each one suited to a particular work surface. In the embodiment pictured in FIG. 15, base 12 comprises a suction assembly 130 for securing the drill support 10 to a work surface. The support body 14 of the drill support 10 comprises a cavity 124 wherein may be stored a suction pump 132, a battery 126 (see FIG. 14), or electronic components such as may be used in an electromagnet, or combinations thereof. For the embodiment pictured in FIG. 15, the suction pump 132 is positioned in cavity 124 and communicates with a suction foot member 140 disposed in base 12 via a vacuum line 138. The base 12 is fitted with a first foot member 142 with at least one vacuum duct 143 in communication with the vacuum line 138 and a second foot member 144 having at least one vacuum duct 145 in communication with the vacuum line 138. A vacuum is applied to a work surface via suction pump 132. Compressed air is applied to an air intake 134 fitted to the wall member 58 of the support body 14, thereby operating the suction pump 132, and creating a vacuum in a cavity 141 below the suction foot member 140. Exhaust from the operation of the suction pump 132 is routed to an exhaust duct 136 secured to the suction pump 132. The exhaust duct 136 may release air within the cavity 124 of the support body 14, which is in communication with the atmosphere. The first foot member 142 comprises a cam lock assembly 146 for loosening the second foot member 144 from the first foot member 142 such that the second foot member 144 may slide a small amount relative to the first foot member 142. This salient feature allows the operator to adjust the drill support 10 after the base 12 has been applied to the work surface (i.e. a vacuum is applied to the work surface thereby securing the drill support 10 to the work surface). As best shown in FIGS. 17 and 17*a*, the cam lock assembly 146 comprises a cam member 148 coupled to a cam follower member 150. The cam follower member 150 is coupled to a cam lock member 152 that is disposed in the second foot member 144. As the cam lever member 148 is rotated, the cam follower 150 pulls the cam lock member 152 against the inner top surface 154 of the second foot member 144, thereby frictionally securing the second foot member 144 to the first foot member 142. Alternatively in one embodiment pictured in FIG. 21, the suction assembly 130 is supplied by an external vacuum supply coupled to a vacuum intake 135 secured to the second end member 58 of the drill support body 14. The vacuum intake 135 communicates with a vacuum line 139 which is in communication with the vacuum duct 143 of the first foot member. In this embodiment, the cam-lock assembly 146 is the same as described above. It is to be understood that the suction assembly comprises any suitable vacuum source disposed either inside the drill support 10 or outside the drill support 10 and communicating with the suction assembly 130, and that the above embodiments are given by way of example only.

In another embodiment pictured in FIG. 14, the base 12 may comprise a magnet assembly 170 to secure the drill support 10 to the working surface. The magnet assembly 170 may be one of several embodiments, a preferred embodiment of which comprises a permanent magnet 172. The permanent magnet 172 is one that is well documented in the art, and comprises a mechanical switch 174 coupled to a smaller magnet 176 rotatably disposed in the permanent magnet 172. When in the switch 174 is in the 'off' position, the magnetic field of the smaller magnet 176 causes the magnetic field generated by the permanent magnet 172 to weaken sufficiently to remove the permanent magnet 172 from any surface that it may have been secured to. The permanent magnet 172 as such is disposed in base 12 of the drill support 10 such that the switch 174 is accessible. The drill support 10 thus is disposed on a work surface that is attractable by a magnetic field, and secured thereto by engaging the switch 174 of the permanent magnet 172 disposed in the base 12.

In an alternative embodiment, the magnetic assembly 170 of base 12 comprises an electromagnet 180, as shown in FIG. 18. Electromagnets are equally well known in the art. At least one wire coil member 182 is connected to a D.C. power supply 184 such as battery 124, or an AC to DC converting power supply, such as a rectifier 186 or a transformer 188. For the embodiment pictured in FIG. 18, the battery 124 is connected to electromagnet 180. The switch 22 interrupts the flow of current to the electromagnet 180. The electromagnet 180 comprises, as shown in FIG. 19 a housing member 190, at least one wire coil 182 secured to the housing member 190, a stiffening member 192 to hold the wire coils 182—182 in position, and a bottom member 194 secured to the wire coils 182—182 and the housing member 190. The electromagnet thus is secured to base 12 of the drill support 10.

With continuing reference to the drawings for the operation and use of the invention, with specific reference to the embodiments thereof being given by way of example only, there is seen in FIG. 1 the drill support 10 of the invention with the drill motor 20 coupled thereto through the saddle 26. The drill motor 20 is manufactured for use with the drill support, but as previously mentioned, a typical drill motor commercially available and well known may be retro-fitted for use with the drill support. The retro-fit drill motor 21 is pictured in FIG. 11. When the drill motor 21 is retro-fitted as such, the drill motor yoke means 100 is disposed on drill 21 such that the chuck 19 of the drill motor 21 passes through aperture 108 of the drill motor yoke means 100. Subsequently, bolt members 94—94 are disposed in apertures 110—110 (see FIG. 10*c*) and secured to the drill motor 21, thereby securing the drill motor yoke means 100 to the drill motor 21 (see FIG. 11). The drill motor mount block means 102 is likewise secured to the drill motor 21, such that the top member 74 of saddle member 26 (see FIGS. 11 and 12) passes along the top edge 120 of the drill motor mount block means 102 and the bottom member 72 of the saddle member 26 passes along the top edge 122 of the drill motor yoke means 100. Preferably, the saddle member 26 passes frictionally thereby. Subsequently, bolt members 94 are disposed in apertures 110 of both the drill motor mount block means 102 and the drill motor yoke means 100 and tightened to the saddle member 26. It is to be understood that the process of retro-fitting the drill motor 21 to the support body is given by example only; a method of quickly releasing the saddle member 26 from the drill motor mount block means 102 and the drill motor yoke means 100 is intended as well. Likewise, a method of quickly engaging and/or releasing the above mentioned drill motor mount block means 102 and drill motor yoke means 100 from the drill motor 21 is intended as well, for maintenance to the drill motor 21, etc. Additionally, as shown in FIGS. 12 and 13, it may become necessary to invert the direction of operation of said drill motor 21, wherein the method of quickly releasing the drill motor from the drill support 10 is efficient. If desired, as shown in FIG. 13, the drill motor mount block means 102 and the drill motor yoke means 100 may be detached from saddle member 26 and reinstalled, such that the top member 74 of the saddle member 26 passes along top edge 122 of the drill motor yoke means 100 and the bottom member 72 of the saddle member 26 passes along the top edge 120 of the drill motor mount block means 102.

After the drill motor 20 is fitted to the saddle member 26, the drill support 10 is placed on the work surface and engaged thereto. In one embodiment shown in FIG. 15, the base 12 of the drill support 10 comprises the suction assembly 130 to create a vacuum between the base and the work surface, thereby securing the drill support 10 to the work surface. The base 12 additionally comprises the cam lock assembly 146 to make minute adjustments to the position of the drill support 10 after it has been suctionally secured to the work surface.

The drill support 10 is lined up on the work surface and compressed air is applied to the air intake 134 of the suction assembly 130, thereby operating suction pump 132 and causing a vacuum to form in the cavity 141 of the suction foot member 140. Alternatively, for the embodiment depicted in FIG. 21, an external vacuum source is connected to the vacuum intake 135, thereby causing a vacuum to from in the cavity 141 of the suction foot member 140. After the drill support 10 is secured to the work surface, the cam lock assembly 146 may be utilized to minutely alter the position of the drill support body 10 relative to the work surface. In reference to FIG. 17*a* for the operation the cam lock assembly 146, the cam lever 148 is rotated thereby releasing the cam lock member 152 from the inner top surface 154 of the second foot member 144. The first foot member 142 is subsequently loosely coupled to the second foot member 144, and as such the first foot member 142, and the drill support body 14 to which it is coupled, may be moved relative to the second foot member 144 to achieve a minute adjustment of the drill support 10 on the work surface after the vacuum has been applied thereto. After such an adjustment is made, cam lever member 148 is then rotated in the opposite direction, thereby frictionally engaging the cam lock member 152 to the inner top surface 154 of the second foot member 144. The second foot member 144 is thus frictionally coupled to the first foot member 142, such that lateral movement is generally arrested.

In another embodiment of the base 12 of the drill support 10, pictured in FIG. 14, a magnet assembly 170 is disposed in said base 12 to secure the drill support 10 to any work surface that attracts a magnet. The magnetic structure or magnet assembly 170 shown in FIG. 14 comprises the permanent magnet 172 disposed in base 12. As previously mentioned, such a permanent magnet is well known in the art. Drill support 10 is disposed on the work surface, and switch 174 is operated to engage the magnetic field of the permanent magnet 172, thereby securing the drill support 10 to the work surface. In an alternative embodiment of the magnet assembly 170 shown in FIG. 18, the magnet assembly 170 is embodied as an electro-magnet 180. Such an electro-magnet is also well known in the art, and many different embodiments thereof exist, each one equally effective in the method of the invention. Thus, the wire-coils 182 of the electro-magnet are disposed in the base 12 of the drill support 10. Drill support 10 is positioned on the work surface, and an direct electrical current is applied to the wire coils 182 via direct current power supply 184, depicted as the battery 124 in FIG. 18 and switched by switch 24, thereby creating a magnetic field and securing the drill support 10 to the work surface.

After the drill support 10 is secured to the work surface, examples such as have described above, drill motor 20 (see FIG. 1) is switched on by the switch 22. The longitudinal motion, or drilling, of drill motor 20 is controlled by grasping the lever member 40 and rotating the saddle actuator handle 28, thereby rotating shaft member 30 (see FIG. 2). As best shown in FIG. 5, as the shaft member 30 is rotated, the teeth 69 of gear member 68 engage the teeth 91 of the gear rack 90, thereby moving the saddle member 26 in a longitudinal direction corresponding to the rotation of the saddle actuator handle 28 (i.e. counter-clockwise rotation may move saddle member 26 towards the base 12 of the drill support). Referring to FIG. 3, the saddle actuator handle 28 may be removed from the first end 38 of the shaft member 30 and reinstalled on the second end 36 of the shaft member 30, to accommodate left-handed persons, or otherwise more easily operate the drill support 10.

Additionally, the saddle member 26 of the drill support, as best shown in FIG. 7 may have tensioning bolts 82—82 disposed therein. The tension of the dove-tail recess 80 applied to the longitudinal lip member 16 (see FIG. 3) may be frictionally increased by installing and tightening the tensioning bolt member 82, as desired, thereby squeezing (see FIG. *7ab*) the female dove-tail recess 80 of the saddle member 26.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A drill support comprising a base, a body secured to and supported by said base; a saddle member movably disposed on the body, and a drill engaged to the saddle member for moving therewith; and said base comprises a first foot member coupled to a second foot member; said first foot member comprises a first suction duct in communication with a suction pump; said second foot member comprises a second suction duct in communication with said first suction duct; and a suction foot secured to said second foot in communication with said second suction duct for securing said base to a work surface by means of vacuum generated therein by said suction pump.

2. A drill support comprising a base; a body secured to and supported by said base; a saddle member movably disposed on the body; and a drill engaged to the saddle member for moving therewith; said body comprises a pair of opposed generally L-shaped sides secured to a bottom; a first end member secured to said bottom and to said generally L-shaped sides; a first top secured to said generally L-shaped sides and to said first end member; a second end member secured to said bottom and to said generally L-shaped sides; a second top secured to the generally L-shaped sides and to said second end member; a partition member secured to said generally L-shaped sides, to said first top member, and to said second top member; a longitudinal lip secured to said first end member such that the combination of said first end member and said longitudinal lip comprises a male dove-tail protrusion joint; and said longitudinal lip additionally comprising a gear rack aligned with and flushed with an outer edge of said longitudinal lip.

3. A drill support comprising a base; a body secured to and supported by said base; a saddle member movably disposed on the body; and a drill engaged to the saddle member for moving therewith; and said saddle member comprises a pair of opposed walls secured to a bottom; a top secured to said opposed walls; a first end wall secured to said top, to said bottom, and to said opposed walls; a second end wall secured to said top, to said bottom, and to said opposed walls; a pair of dove-tail protrusions formed in said first end wall; a shaft is rotatably disposed in said saddle member such that said shaft extends from one of said opposed walls to another of said opposed walls; a saddle actuator handle is secured to one end of said shaft; a tensioning cutout is disposed in said first end wall; a gear cutout is disposed in said first end wall; and a gear is coupled to said shaft such that said gear is situated in said gear cutout.

4. The drill support of claim 1 wherein said body comprises a pair of opposed generally L-shaped sides secured to a bottom; a first end member secured to said bottom and to said generally L-shaped sides; a first top secured to said generally L-shaped sides and to said first end member; a second end member secured to said bottom and to said generally L-shaped sides; a second top secured to the generally L-shaped sides and to said second end member; a partition member secured to said generally L-shaped sides, to said first top member, and to said second top member; a longitudinal lip secured to said first end member such that the combination of said first end member and said longitudinal lip comprises a male dove-tail protrusion joint; and said longitudinal lip additionally comprising a gear rack aligned and flushed with an outer edge of said longitudinal lip.

5. A drill support comprising a base; a body secured to and supported by said base; a saddle member movably disposed on the body; and a drill engaged to the saddle member for moving therewith; and said drill comprises a drill motor having a chuck; said drill motor comprises a yoke means secured thereto for securing said drill motor to said saddle member; and a mount block means secured to said drill motor for securing said drill motor to said saddle member; said yoke means comprises a first yoke plate member and a second yoke plate member secured such that said first yoke plate member and said second yoke plate member define a structure that is generally L-shaped, wherein said first yoke plate member comprises an aperture disposed therein for slidably receiving said chuck; said mount block means comprises a first plate member and a second plate member secured such that said first plate member and said second plate member define a structure that is generality L-shaped, and a pair of opposed brace members secured to the first plate member and the second plate member; said yoke means and said block mount means secured to the drill motor such that said yoke means and said block means define a saddle opening therebetween for slidably receiving said saddle member.

6. The drill support of claim 1 wherein said saddle member comprises a pair of opposed walls secured to a bottom; a top secured to said opposed walls; a first end wall secured to said top, to said bottom, and to said opposed walls; a second end wall secured to said top, to said bottom, and to said opposed walls; a pair of dovetail protrusions formed in said first end wall; a shaft is rotatably disposed in said saddle member such that said shaft extends from one of said opposed walls to another of said opposed walls; a saddle actuator handle is secured to one end of said shaft; a tensioning cutout is disposed in said first end wall; a gear cutout is disposed in said first end wall; and a gear is coupled to said shaft such that said gear is situated in said gear cutout.

7. The drill support of claim 2 wherein said saddle member comprises a pair of opposed walls secured to a bottom; a top secured to said opposed walls; a first end wall secured to said top, to said bottom, and to said opposed walls; a second end wall secured to said top, to said bottom, and to said opposed walls; a pair of dovetail protrusions formed in said first end wall; a shaft is rotatably disposed in said saddle member such that said shaft extends from one of said opposed walls to another of said opposed walls; a saddle actuator handle is secured to one end of said shaft; a tensioning cutout is disposed in said first end wall; a gear cutout is disposed in said first end wall; and a gear is coupled to said shaft such that said gear is situated in said gear cutout.

8. The drill support of claim 1 wherein said drill comprises a drill motor having a chuck; said drill motor comprises a yoke means secured thereto for securing said drill motor to said saddle member; and a mount block means secured to said drill motor for securing said drill motor to said saddle member; said yoke means comprises a first yoke plate member and a second yoke plate member secured such that said first yoke plate member and said second yoke plate member define a structure that is generally L-shaped, wherein said first yoke plate member comprises an aperture disposed therein for slidably receiving said chuck; said mount block means comprises a first plate member and a second plate member secured such that said first plate member and said second plate member define a structure that is generally L-shaped, and a pair of opposed brace members secured to the first plate member and the second plate member; said yoke means and said block mount means secured to the drill motor such that said yoke means and said block means define a saddle opening therebetween for slidably receiving said saddle member.

9. The drill support of claim 2 wherein said drill comprises a drill motor having a chuck; said drill motor comprises a yoke means secured thereto for securing said drill motor to said saddle member; and a mount block means secured to said drill motor for securing said drill motor to said saddle member; said yoke means comprises a first yoke plate member and a second yoke plate member secured such that said first yoke plate member and said second yoke plate member define a structure that is generally L-shaped, wherein said first yoke plate member comprises an aperture disposed therein for slidably receiving said chuck; said mount block means comprises a first plate member and a second plate member secured such that said first plate member and said second plate member define a structure that is generally L-shaped, and a pair of opposed brace members secured to the first plate member and the second plate member; said yoke means and said block mount means secured to the drill motor such that said yoke means and said block means define a saddle opening therebetween for slidably receiving said saddle member.

10. The drill support of claim 4 wherein said drill comprises a drill motor having a chuck; said drill motor comprises a yoke means secured thereto for securing said drill motor to said saddle member; and a mount block means secured to said drill motor for securing said drill motor to said saddle member; said yoke means comprises a first yoke plate member and a second yoke plate member secured such that said first yoke plate member and said second yoke plate member define a structure that is generally L-shaped, wherein said first yoke plate member comprises an aperture disposed therein for slidably receiving said chuck; said mount block means comprises a first plate member and a second plate member secured such that said first plate member and said second plate member define a structure that is generally L-shaped, and a pair of opposed brace members secured to the first plate member and the second plate member; said yoke means and said block mount means secured to the drill motor such that said yoke means and said block means define a saddle opening therebetween for slidably receiving said saddle member.

11. The drill support of claim 3 wherein said drill comprises a drill motor having a chuck; said drill motor comprises a yoke means secured thereto for securing said drill motor to said saddle member; and a mount block means secured to said drill motor for securing said drill motor to said saddle member; said yoke means comprises a first yoke plate member and a second yoke plate member secured such that said first yoke plate member and said second yoke plate member define a structure that is generally L-shaped, wherein said first yoke plate member comprises an aperture disposed therein for slidably receiving said chuck; said mount block means comprises a first plate member and a second plate member secured such that said first plate member and said second plate member define a structure that is generally L-shaped, and a pair of opposed brace members secured to the first plate member and the second plate member; said yoke means and said block mount means secured to the drill motor such that said yoke means and said block means define a saddle opening therebetween for slidably receiving said saddle member.

12. The drill support of claim 6 wherein said drill comprises a drill motor having a chuck; said drill motor comprises a yoke means secured thereto for securing said drill motor to said saddle member; and a mount block means secured to said drill motor for securing said drill motor to said saddle member; said yoke means comprises a first yoke plate member and a second yoke plate member secured such that said first yoke plate member and said second yoke plate member define a structure that is generally L-shaped, wherein said first yoke plate member comprises an aperture disposed therein for slidably receiving said chuck; said mount block means comprises a first plate member and a second plate member secured such that said first plate member and said second plate member define a structure that is generally L-shaped, and a pair of opposed brace members secured to the first plate member and the second plate member; said yoke means and said block mount means secured to the drill motor such that said yoke means and said block means define a saddle opening therebetween for slidably receiving said saddle member.

13. The drill support of claim 7 wherein said drill comprises a drill motor having a chuck; said drill motor comprises a yoke means secured thereto for securing said drill motor to said saddle member; and a mount block means secured to said drill motor for securing said drill motor to said saddle member; said yoke means comprises a first yoke plate member and a second yoke plate member secured such that said first yoke plate member and said second yoke plate member define a structure that is generally L-shaped, wherein said first yoke plate member comprises an aperture disposed therein for slidably receiving said chuck; said mount block means comprises a first plate member and a second plate member secured such that said first plate member and said second plate member define a structure that is generally L-shaped, and a pair of opposed brace members secured to the first plate member and the second plate member; said yoke means and said block mount means secured to the drill motor such that said yoke means and said block means define a saddle opening therebetween for slidably receiving said saddle member.

14. The drill support of claim 4 wherein said base additionally comprises a cam lock assembly for adjustment of said first foot relative to said second foot after said vacuum has been applied to said work surface; said cam lock assembly comprises a cam lever member disposed in said first foot coupled to a cam follower member disposed in said first foot; a cam lock member disposed in said second foot coupled to said cam follower member such that said cam lock member frictionally engages said second foot when said cam lever member is operated.

15. The drill support of claim 2 wherein said base comprises an electromagnet disposed therein for securing said base to a work surface, said electromagnet comprising at least one wire coil secured to said base; a support member secured to said wire coil; a switch for operation of said electromagnet; and a D.C. power supply.

16. The drill support of claim 2 wherein said base comprises a permanent magnet secured to said base for securing said base to a work surface, said permanent magnet comprising a switch for activating or deactivating a magnetic field generated by said permanent magnet.

17. A method for drilling comprising the steps of:

(a) providing a drill support comprising a body, a saddle member for securing a drill to said body, and a drill having a chuck;

(b) disposing the drill on said saddle member of the drill support such that the drill is in a generally vertical position with the chuck of the drill pointed in a downward direction;

(c) drilling with said drill;

(d) stopping;

(e) removing said drill from the saddle member;

(f) re-disposing the drill on the saddle member such that the drill is in a generally vertical position with the chuck of the drill pointed in an upward direction;

(g) drilling with the drill.

18. The method of claim 17 wherein said drill support additionally comprises a work surface engaging base comprising a suction foot member.

19. The method of claim 18 additionally comprising securing said drill support to a work surface prior to said drilling step (c).

* * * * *